Patented Apr. 14, 1936

2,037,017

UNITED STATES PATENT OFFICE 2,037,017

METHOD OF PHOTOGRAPHIC MAPPING

Irvine C. Gardner, Chevy Chase, Md.

No Drawing. Application July 18, 1934,
Serial No. 735,835

4 Claims. (Cl. 95—5)

(Granted under the act of March 3, 1883, as
amended April 30, 1928; 370 O. G. 757)

The invention described herein may be manufactured and used by or for the Government of the United States for governmental purposes without the payment of any royalty thereon.

In aerial photography as now employed in the art of map making by the air services of the United States and foreign countries, a plurality (5 or 9) of distortion free lens systems are used, each lens system being provided with a separate light sensitive surface coordinated with its axis. These lens systems are usually arranged with one lens system having a vertical axis and a plurality (4 or 8) lens systems having their axes inclined obliquely with respect to the central vertical axis. In the use of the apparatus as now employed, errors in mapping are introduced because of the mechanical difficulties involved in the use of rectifiers for the separate negatives produced by the oblique lens systems and the mechanical cutting and matching of the several views.

Hitherto, the camera lenses used for airplane photography for mapping purposes have been designed to produce images sensibly free from distortion and this distortion-free requirement, together with the requirements for a large aperture ratio and a flat well defined field have limited the lens designer so that it has been impossible to obtain a lens suitable for airplane photography with an angular field greater than 60 or 70 degrees. It is restrictions of this nature that have made necessary the development of the multiple lens camera.

It is one of the objects of my invention to eliminate the mechanical features of the cutting and matching of the several pictures by employing in the camera a single lens system having an angular field of the order of 110° to 140° and which concentrates the photographic field on a single light sensitive surface. In this manner I avoid the necessity of the use of rectifiers and the errors introduced thereby.

In my improved method of photographic mapping I arrange a lens system having a large amount of negative distortion (i. e., for objects of the same size disposed at increasing distances from the center of the object field, images of smaller size are produced, the size of the image being an inverse function of the distance of the object from the center of the field) with its axis substantially perpendicular to the object field, distorting the light rays from the object field as they pass through the lens system, impinging the distorted rays on a single light sensitive surface, chemically treating the light sensitive surface to produce a photographic negative having a large amount of negative distortion (i. e., the scale of the negative changes from the center outward so that objects of the same size are represented by smaller images as the distance of the image from the center of the negative increases). I prefer, then, to pass light rays through the negative and through a second lens system which distorts the transmitted rays to produce an undistorted image of the original object field on a second light sensitive surface and develop this second light sensitive surface into a positive photograph map. Instead of varying the transmitted light by transmission through the negative I may also make a positive thereof and vary the light by reflection therefrom.

The first lens system or camera lens system as I prefer to call it is corrected to produce an image free from aberrations other than distortion when the object field is a sensibly plane surface normal or approximately normal to the axis of the camera lens system and at a distance infinite or relatively large with respect to the focal length of the camera lens system. The distortion of the camera lens system is negative (i. e., the system is so constructed that the scale of the image of the object field decreases as a function of the distance from the center of the object field).

This second lens system or copying lens system as I prefer to call it has positive distortion in such an amount that it corrects for the negative distortion of the first lens system or camera lens system. I have found that any vignetting introduced by this copying lens system may be compensated for by suitably controlling the illumination of the negative.

The copying lens system bears a superficial resemblance to the camera lens system except that in normal use the light is transmitted through the system in the reverse direction, that is to say, its distortion is positive. The copying lens system is corrected in such a manner that the distorted image obtained with the camera lens system, when projected through the copying lens system, has its distortion neutralized and the second image becomes similar to the original object field. The camera lens system used in conjunction with a telescopic lens system may be employed in lieu of the copying lens when only a virtual image is desired.

A camera lens of the type of my invention having a large amount of negative distortion deliberately introduced, secures the following advantages:

(1) It becomes possible to secure satisfactory definition over a much larger field with an aperture ratio suitable for airplane photography.

(2) The width of film required to record a given angular field of view is very much reduced.

(3) The exposure over the field of view is equalized with consequent lessening of vignetting because the peripheral portions of the image, which are usually less fully exposed than the axial portions, are reproduced to a smaller scale, thus increasing the effective illumination.

That is to say, if a photographic lens is so designed that the lens cell and the peripheries of the lens components do not introduce any additional vignetting, the illumination, at an angular $\theta$ from the axis is reduced to $\cos^4 \theta$ where the intensity on the axis is assumed to be 1. The angle $\theta$ is measured on the image side of the lens. The extent of field that is practicable is, therefore, limited by the latitude of the photographic emulsion. If, for example, a ratio of 1 to 2 is the maximum disparity between the illumination at the edge and center of the field that can be tolerated, the maximum angle possible is defined by the equation $$\cos^4 \theta = \tfrac{1}{2}$$

and, solving, $\theta = 32$ degrees, approximately. If the lens is sensibly free from distortion, $\theta$ on the image side equals $\theta$ on the object side of the lens and 64° (32° half angle) is the maximum angular field of view which can be obtained without exceeding the assumed variation in illumination. If, however, the lens has considerable negative distortion so that 32° on the image side corresponds to a larger angle, say 50° on the object side, then a total field of 100° can be obtained with the same amount of vignetting.

The large field of view obtainable with a single lens and made possible by the admission of a large amount of distortion offers the following important advantages:

(1) It becomes unnecessary to use a plurality of lens systems to secure a satisfactory large field of view. The substitution of a single lens for the plurality of lenses greatly simplifies the mechanism of the camera and greatly reduces the weight.

(2) As the entire photograph is produced by a single lens, a finished picture free from distortion may be obtained by a single copying operation and the errors resulting from the imperfect alignment of the chambers of the multiple lens camera and from the imperfect matching of the separate prints are eliminated.

The use of my invention also permits the following method to be employed in which the distorted negative made with the airplane camera lens is utilized for the production of a correct visual map without the production of an undistorted copy. In this application, the original negative, or a positive made from it without the elimination of distortion, is mounted in the focal plane of the camera lens with which the photograph was taken or a lens equivalent to it as regards focal length and distortion. When the negative, or positive as the case may be, is illuminated or reflected light, the lens forms a virtual image of the object, undistorted, and at an infinite distance. By means of a telescope system, directed through the lens, any part of this image may be viewed and the different portions of the object will appear undistorted and in correct perspective. The negative, or positive and, the camera lens, or its equivalent, suitably mounted with respect to each other, therefore constitute a unit which may be mounted as a part of a photo-theodolite or automatic mapping device and viewed by means of its telescopic system. The locations of the different parts of the object may then be measured separately and located on a map manually or the usual automatic methods of plotting utilizing stereoscopic projection or other means may be employed.

Having thus described my invention, what I claim is:

1. The method of photographic mapping which consists in arranging a camera lens system, having negative distortion along all radii of the field, with its axis substantially perpendicular to an object field, distorting the light rays from the object field as they pass through the camera lens system, impinging the distorted rays on a single light sensitive surface to produce an image having a large amount of negative distortion, chemically treating the light sensitive surface to produce a negative of said image, passing light rays through the photographic negative and through a copying lens system which distorts the transmitted light rays to produce an undistorted image of the original object field on a second light sensitive surface and developing said second light sensitive surface.

2. The method of mapping which consists in photographically producing a negative image having negative distortion which for any point of the object field is a function only of the distance of that point from the center of the field, transmitting light through said photographic negative and through a second lens system having positive distortion in an amount sufficient to neutralize the distortion of said photographic negative and photographically reproducing the image produced by said second lens system.

3. The method of mapping which consists in photographically producing an image having negative distortion in which all points of the object field, at any given distance from the center of the field, are equally compressed toward the center of the field, varying the intensity of transmitted light by said photographic image, passing said transmitted light through a second lens system having a positive distortion in an amount sufficient to neutralize the distortion of said image, and photographically reproducing the image produced by said second lens system.

4. The method of mapping which consists in photographically producing an image having negative distortion along all radii of an object field, varying the intensity of transmitted light by said photographic image and passing said light through a lens system producing positive distortion in an amount sufficient to neutralize the distortion of said image.

IRVINE C. GARDNER.